(12) United States Patent
Sommer et al.

(10) Patent No.: US 6,920,086 B1
(45) Date of Patent: Jul. 19, 2005

(54) METHOD FOR RECORDING AND REPRODUCING RADIO INFORMATION AND CORRESPONDING SYSTEM

(75) Inventors: Sören Sommer, Hildesheim (DE); Joachim Wietzke, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,064

(22) PCT Filed: May 25, 2000

(86) PCT No.: PCT/DE00/01693

§ 371 (c)(1),
(2), (4) Date: Jun. 19, 2002

(87) PCT Pub. No.: WO00/76097

PCT Pub. Date: Dec. 14, 2000

(30) Foreign Application Priority Data

Jun. 4, 1999 (DE) ........................................ 199 25 581

(51) Int. Cl.[7] .................................................. H04B 1/20
(52) U.S. Cl. ................. 369/6; 369/21; 386/46; 725/75
(58) Field of Search ................................ 369/1, 2, 3, 4, 369/6, 7, 8, 21; 386/46, 125; 725/75, 82, 85; 455/45, 226.1; 228/345; 340/905

(56) References Cited

U.S. PATENT DOCUMENTS

| 4,862,513 A | * | 8/1989 | Bragas | .......................... 455/45 |
| 5,697,048 A | | 12/1997 | Kimura | ........................ 725/75 |
| 5,734,780 A | | 3/1998 | Oki et al. | ..................... 386/46 |

FOREIGN PATENT DOCUMENTS

| DE | 37 21 279 | 2/1988 |
| DE | 38 05 457 | 8/1989 |
| DE | 44 08 930 | 9/1995 |

* cited by examiner

*Primary Examiner*—Ali Neyzari
(74) *Attorney, Agent, or Firm*—Kenyon & Kenyon (57) ABSTRACT

A method for the reproduction of information, as well as an arrangement therefor, are proposed, in which upon the arrival of information from a first information source, that information is recorded; if no information from a further information source is present, the information from the first information source is reproduced; if information from a further information source is present, that information is reproduced on a priority basis before the information from the first information source; and if, during the reproduction of information from the first information source, information from a further information source arrives, reproduction of the information from the first information source is interrupted, and the information from the further information source is reproduced, in which after completion of the reproduction of the information from the further information source, any information from the first information source not reproduced or not completely reproduced can be reproduced from the recording system automatically or in user-initiated fashion. The subject matter of this invention thus makes possible conflict-free reproduction of a plurality of simultaneously pending information elements from various information sources, and thus improved comprehension and perception of the information by the user.

5 Claims, 4 Drawing Sheets

METHOD FOR RECORDING AND REPRODUCING RADIO INFORMATION AND CORRESPONDING SYSTEM

FIELD OF THE INVENTION

The present invention is based on a method for the reproduction of information and on an arrangement for the reproduction of information.

BACKGROUND INFORMATION

Methods for the reproduction of information and devices for the reproduction of information have been known for some time, for example in the form of radio receivers in which a radio program broadcast over a radio transmission frequency by radio transmitters is acoustically reproduced.

According to the "Specifications of the radio data system RDS for VHF/FM sound broadcasting" of the European Broadcasting Union dated March 1984, radio transmitters send by way of radio transmission frequencies, in addition to the actual radio programs, further information in the form of digital data, for example program identifiers (PI), with which a radio receiver suitable for the reception of such data can, independently and with no intervention by the user, perform a plurality of operations, in particular those necessary for interference-free reception; thus, for example, the driver of a motor vehicle in which the radio receiver is installed does not need to make any manual inputs to the RDS car radio and therefore can concentrate his or her attention entirely on traffic.

Also transmitted in the context of the radio data system (RDS), in accordance with the aforementioned RDS specifications for controlling a radio receiver suitable for receiving such information, is additional information such as a TA (traffic announcement) code that assumes a defined value during reproduction of traffic messages within the received radio program and thus, for example, enables a volume increase of an otherwise muted radio receiver for the duration of a radio traffic announcement.

Also transmitted in similar fashion in the context of the radio programs broadcast over radio transmission frequencies, by way of the ARI (Autofahrer Rundfunk Informationen) (Driver Radio Information) system established since the 1970s, is an announcement identifier (DK), comparable to the TA code of the RDS system, that identifies traffic information broadcast within the radio programs.

German Published Patent Application No. 38 05 457 discloses a radio receiver for a vehicle which evaluates a transmitter-side identifying signal of this kind in such a way that upon broadcast of a traffic datum characterized by an identifying signal, the reproduction volume is switched to a preset value.

German Published Patent Application No. 37 21 279 discloses a radio receiver that, upon the occurrence of identifying signals (i.e. the announcement identifier) that accompany traffic messages, records the pertinent traffic announcements in a digital voice memory, so that after recording, the traffic messages are continuously available for playback. In the case of the known radio receiver, those data that are received via a transmitter installed on the receiving section can be stored.

Also known, for example from the current brochure "Programm '98/'99—Mobile Kommunikation" of the company styled Blaupunkt-Werke GmbH, are radio receivers in the form of car radio units that possess additional functions in addition to the function of a radio receiver, for example a built-in radiotelephone (the "Amsterdam TCM 127" unit may be mentioned here as an example); a TMC traffic radio receiver, e.g. a "Viking TMC 148" unit; a vehicle navigation unit, e.g. a "TravelPilot RGN 08" unit in combination with the "New York RDM 127" unit; or a traffic telematics functionality, e.g. a "Gemini GPS 148" unit. As may be gathered from the description of the aforementioned units, information output is accomplished either on a display unit in the form of an LCD display of the units, or by way of a loudspeaker connected to the unit.

In the case of, for example, the combination of radio receiver and navigation unit, a current traffic radio announcement (identified, for example, with the TA code or DK identifier) may chronologically overlap changing driving instructions of the navigation unit, which are displayed on the display unit of the car radio or reproduced acoustically in the form of synthetic speech. In other kinds of units, such as the above-described combination of radio and telephone, the telephone conversation may take precedence over a current announcement, so that in some circumstances the announcement is brought only partially, or not at all, to the use's attention.

No consideration has been given to attention conflicts that have hitherto arisen in the context of the simultaneous modification of acoustically and optically reproduced information, for example, in the case of acoustically reproduced traffic information and simultaneous complex, optically reproduced driving instructions.

SUMMARY OF THE INVENTION

The method and the arrangement according to the present invention have the advantage that conflict situations or attention conflicts are avoided by simultaneous reproduction of information from different information sources that are coupled to other in accordance with the present invention. This is achieved by way of a time offset in the reproduction of information simultaneously awaiting reproduction. The intelligibility and comprehensibility of the reproduced information for the user are thereby improved.

When the present invention is used for information devices in a motor vehicle, distraction of the vehicle driver is moreover decreased as a result of a reduced need for concentration in order to understand the information, so that the driver can devote a greater amount of attention to traffic.

The present invention thus makes possible an increase in the car driver's attention to traffic while simultaneously maintaining the amount of information conveyed to the vehicle driver.

It is additionally advantageous that the method according to the present invention can be implemented in the form of software, without additional outlay in terms of circuitry, in existing car radio units which have a speech memory, for example as described in German Published Patent Application No. 37 21 279.

DETAILED DESCRIPTION

Figure 1:
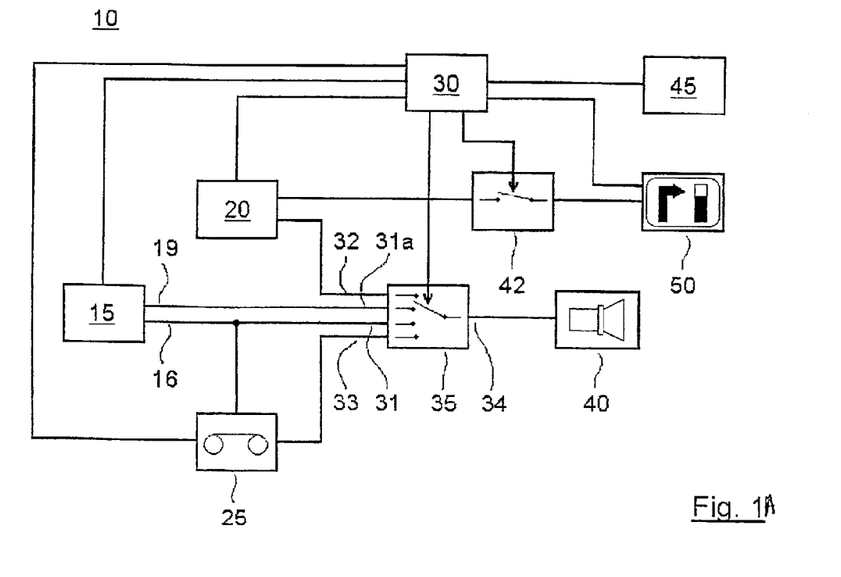
FIG. 1A is a block diagram of that portion significant in terms of the invention of an arrangement according to the present invention for the reproduction of information.
FIG. 1B shows a detail of the block diagram of FIG. 1A.
FIG. 1C shows a further detail of the block diagram of FIG. 1A.
FIG. 1D shows an alternative approach to FIG. 1C.

FIG. 1A shows a block diagram of the portion significant in terms of the invention of an arrangement according to the present invention for carrying out the method according to the present invention.

Arrangement 10 for the reproduction of information comprises a first information source 15 which in the present exemplary embodiment is a radio receiver with traffic radio decoder, at whose output, upon transmission over a radio transmission frequency of traffic information identified as such, the traffic information is present as an acoustic signal.

Figure 1B:
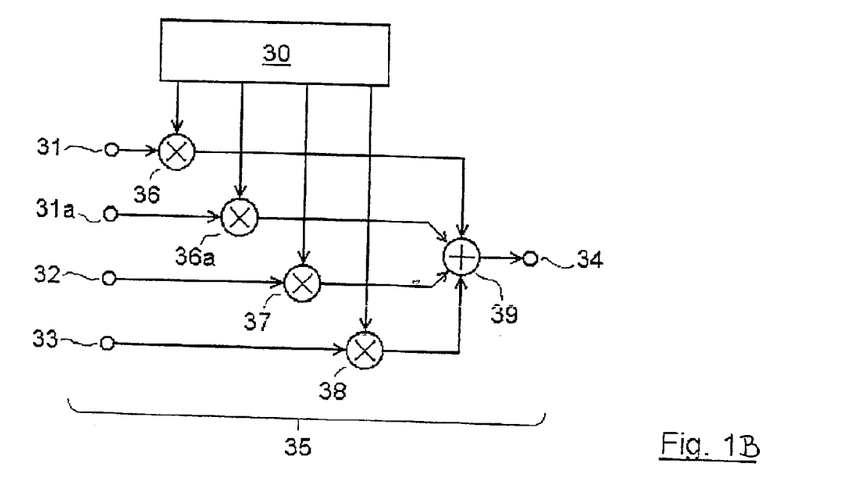
Figure 1C:
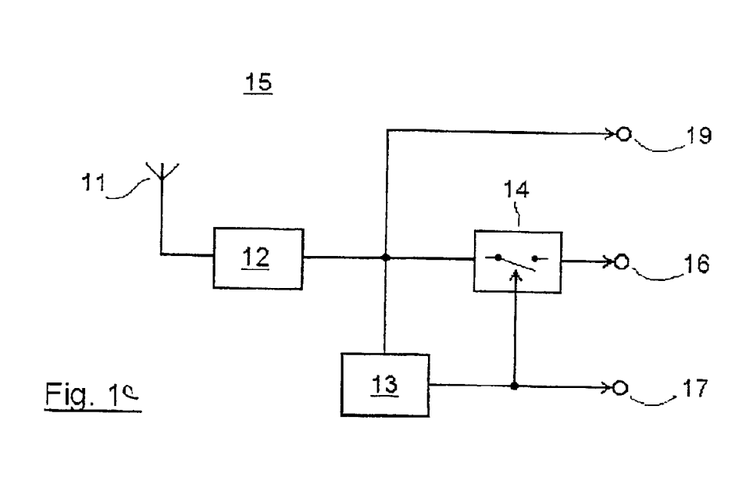

In a first embodiment, depicted in FIG. 1C, of traffic radio receiver 15, the latter is an ordinary radio receiver having a receiving section 12 to which carrier-frequency radio signals are conveyed via a receiving antenna 11. Receiving section 12 comprises, in a manner known per se, the elements for selection, reception, and demodulation of a radio transmission frequency Present at output 19 of receiving section 12 is the stereo multiplex (MPX) signal, obtained from the radio transmission frequency by demodulation, that contains the audio signal for the left and right channels as well as optionally further information—such as TA or announcement identifiers according to RDS or ARI standard, if traffic information is transmitted as part of the radio program—in the form of a frequency position multiplex. The MPX signal is conveyed to a decoder 13 for the TA or DK announcement identifiers transmitted according to the RDS and/or ARI standard, at whose output 17, upon detection of a TA or ARI announcement identifier, a signal indicating the transmission of traffic information is present. In the simplest case, this signal is a binary signal that, in the event a TA or DK identifier is detected, assumes a value of, for example, 1 (binary). The output signal of decoder 13 is conveyed to a control input of a second controllable switch 14 to which the MPX signal present at the output of receiving section 12 is conveyed. In the event a TA or DK identifier is detected by decoder 13, the latter then delivers a signal indicating a traffic announcement, which signal closes switch 14. Thus in the event a TA or DK identifier is detected, the MPX signal is sent to output 16 of the traffic radio receiver. In the absence of a TA or DK identifier, on the other hand, no signal is present at the output of the further controllable switch 14.

Figure 1D:
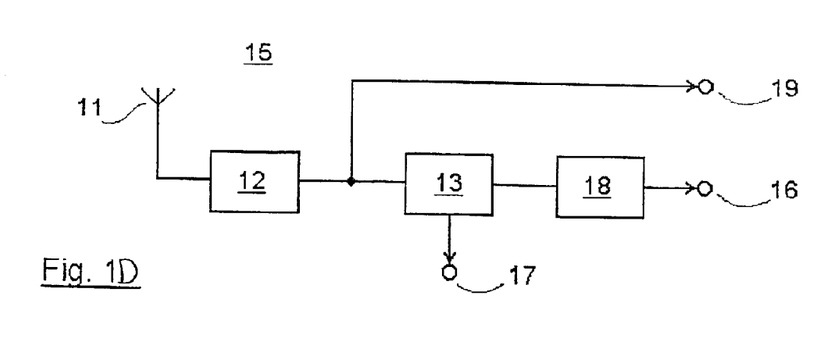

In a second embodiment, depicted in FIG. 1D, of traffic radio receiver 15, the latter is a TMC (traffic message channel) receiver for receiving traffic information transmitted within the radio data system in accordance with the TMC standard. According to the TMC standard, (traffic) events are transmitted in the form of digital data as part of the radio data signal. Associated with the events are, inter alia, a location code that indicates the event location, an event code that indicates the type of event (e.g. a traffic jam), and a code for spatial extension (for example, the length of the jam).

Similarly to the traffic radio receiver already described, the TMC receiver comprises a receiving antenna 11 and a receiving section 12, connected thereto, for selecting, receiving, and demodulating a radio transmission frequency. Here as well, the MPX signal that can be picked off at the output of receiving section 12 is conveyed to a decoder 13 which, however, in contrast to the traffic radio receiver already described, is a TMC decoder. The latter detects, within the RDS signal contained in the MPX signal, TMC traffic information transmitted via the received radio transmission frequency, and upon detection of TMC traffic information delivers a signal that can be picked off at its output 17. The TMC data that have been received and isolated from the RDS signal and are present at the output of decoder 13 are conveyed to a speech synthesizer that, by referring to a speech resource stored in the decoder, converts the digital TMC data into synthetic speech. The synthesized, acoustically reproducible speech signal can be picked off at output 16 of speech synthesizer 18.

The embodiment described above of the TMC receiver represents a particularly simple embodiment that was selected in the interest of a clear and easily understood presentation. In a real TMC receiver, on the other hand, it is advantageous to store not the synthetic speech signals but instead the received TMC data, and to convey them to the forwarding circuit only when they are reproduced via a speech synthesizing system 18. In this case, with a real TMC receiver as the traffic radio receiver, the separate recording unit could thus be dispensed with; it could be replaced by a recording unit, downstream from TMC decoder 13 and upstream from speech synthesizer 18, that, like recording unit 25, would need to be connected to controller 30 in order to control recording and reproduction.

Both the radio receiver of the first embodiment and the TMC receiver of the second embodiment of traffic radio receiver 15 comprise a further output 19 at which the stereo multiplex signal that contains the radio program to be reproduced, which is received via the radio frequency currently set on receiving section 12, is present.

The output signal of first output 16 of first information source 15, i.e. a traffic radio announcement, is conveyed to a first input 31 of a circuit 35 for forwarding information, hereinafter referred to simply as forwarding circuit 35. An exemplary embodiment of forwarding circuit 35 is depicted in FIG. 1B. The output signal(s) of at least one further information source 20 is/are furthermore conveyed to at least one further input 32, 33 of forwarding circuit 35. Lastly, output 19, i.e. the stereo multiplex signal containing a radio transmission that is to be reproduced, is conveyed to a further input 31a of forwarding circuit 35.

According to the present invention, the further information source(s) is/are, for example, a vehicle navigation unit that, following input of a destination by the vehicle user, generates on the basis of current position information, and with the aid of stored map material, driving instructions to guide the vehicle driver. The driving instructions are reproduced in the form of acoustic driving instructions. In an alternative embodiment of the navigation unit, the latter delivers optical driving instructions, for example in the form of a directional arrow to indicate a turn and an indication of the distance remaining until the turning point, and/or acoustic driving instructions. In this instance, a corresponding output of navigation unit 20 is connected via a third switch 42 to a display unit 50. Also relevant as further information sources 20, however, are e.g. a radio telephone integrated into a device according to the present invention, or a parking aid. In this context, any such further information source does not necessarily take the place of navigation unit 20, but rather can be additionally connected to the forwarding circuit via a corresponding additional input.

The purpose of forwarding circuit 35 is, as a function of a control signal generated by a controller 30, to forward one of the signals or information elements conveyed from the information sources, and to suppress the information from the other information sources that are connected. In a very simple exemplary embodiment of forwarding circuit 35 indicated in FIG. 1A, this happens by way of a controllable switch 35 to whose outputs 31, 31a, 32, and 33 the first and the further information source(s) are connected, output 34 of controllable switch 35 being connectable to only one of the inputs at a time.

In an exemplary embodiment of forwarding circuit 35 depicted in FIG. 1B, which preferably is suitable for acoustic information signals, the circuit is embodied as a mixing or fading circuit, inputs 31, 31a, 32, 33 (and consequently the output signals of information sources 15, 20 connected to the inputs) being conveyed to multipliers 36, 36a, 37, and 38 in which the signals are weighted with a factor generated by controller 30. Once weighted (i.e. individually influenced in terms of their amplitude), the signals of the various information sources 15, 20 are added up in an adder 39 and conveyed to output 34 of forwarding circuit 35. Multiplication by suitable factors—e.g. a value "0" for a signal to be suppressed, and a value "1" for the signal to be forwarded—makes possible selective forwarding of the information signals that have been conveyed. A suitable time profile for the factors, for example an exponential profile, makes it possible to fade in and out the signals that are to be forwarded and suppressed. It is also conceivable for information signals that require suppression to be suppressed not completely, but only partially. It is thus possible, for example, to allow the reproduction of a currently reproduced radio program to continue at reduced volume, i.e. in the background, even during an acoustic and/or optical driving instruction.

Output 34 of forwarding circuit 35 is conveyed to a reproduction apparatus 40, in the present case a reproduction apparatus for acoustic signals, which in known fashion comprises the elements for the reproduction of acoustic information signals, such as volume and optionally tone controls, a low-frequency amplifier, and loudspeakers.

In another embodiment, a separate display unit 50, which in known fashion has the elements for the presentation of optical information (such as a display driver and a display) and which is activated, for example, by way of a third switch 42 controlled by controller 30, can be provided for the output of information that is to be presented optically. Display unit 50 can, in known fashion, be used not only to display optical driving instructions but also to display, for example, functions of radio 15, for example the radio station currently tuned in, the radio frequency, or the like. For that purpose, it is also connected to controller 30, which forwards corresponding signals of radio receiver 15.

As already mentioned, forwarding circuit 35 is controlled by a controller 30 to which the output signals of output 17 of decoder 13 of first information source 15, and signals of the further connected information sources providing comparable information, are conveyed. The controller is additionally connected to a recording unit 25 for recording the information of first information source 15, which unit has, in known fashion, the elements for recording and playing back the recorded information. In the present case, the recording unit is a digital speech-memory that-is known, for example, from car radio units as described in German Published Patent Application No. 37 21 279. Alternatively, an analog speech memory can also be provided.

Recording unit 25 is connected on the output side to input 33 of forwarding circuit 35, so that recorded information from the first information source can be forwarded via forwarding circuit 35 to reproduction apparatus 40.

Lastly, the controller is connected to an control unit 45, known per se, having control elements for controlling a unit according to the present invention in which arrangement 10 according to the present invention is implemented, and a display unit 50 for displaying the operating state of the unit or also for presenting information from one of the information sources.

With regard to the present invention, the purpose of controller 30 is, when information from one of the at least one further information sources 20 is present, to pass on the information on a priority basis before information from first information source 15, and thus to make possible its undisturbed reproduction. Controller simultaneously 30 controls the recording of information from first information source 15 by way of recording unit 25, as well as playback thereof when no information from a further information source 20 is present. Lastly, the controller also is configured, for the case in which the first information source is embodied as a radio receiver, for the reproduction of a radio transmission received via a radio frequency currently being received.

Controller 30 thus brings about recording of any currently arriving information from first information source 15, i.e. for example from traffic radio receiver 15, in recording unit 25. Prior to isochronous reproduction of the current information from the first information source, controller 30 checks whether information from a further information source 20, i.e. for example navigation unit 20, needs to be conveyed to the user at the same time. Reproduction of the information from first information source 15 is automatically performed in time-offset fashion if immediate reproduction would overlap in time with the reproduction of information from a further information source 20. If information from a further information source 20 is present during the reproduction of current information from first information source 15, reproduction of the information from the first information source is discontinued, and reproduction of the information from further information source 20 takes place. The information from the first information source nevertheless continues to be recorded in the meantime. Complete reproduction of the information from first information source 15 is then accomplished at a later point in time, when reproduction of the information from further information source 20 is complete and recording is complete.

Figure 3A:
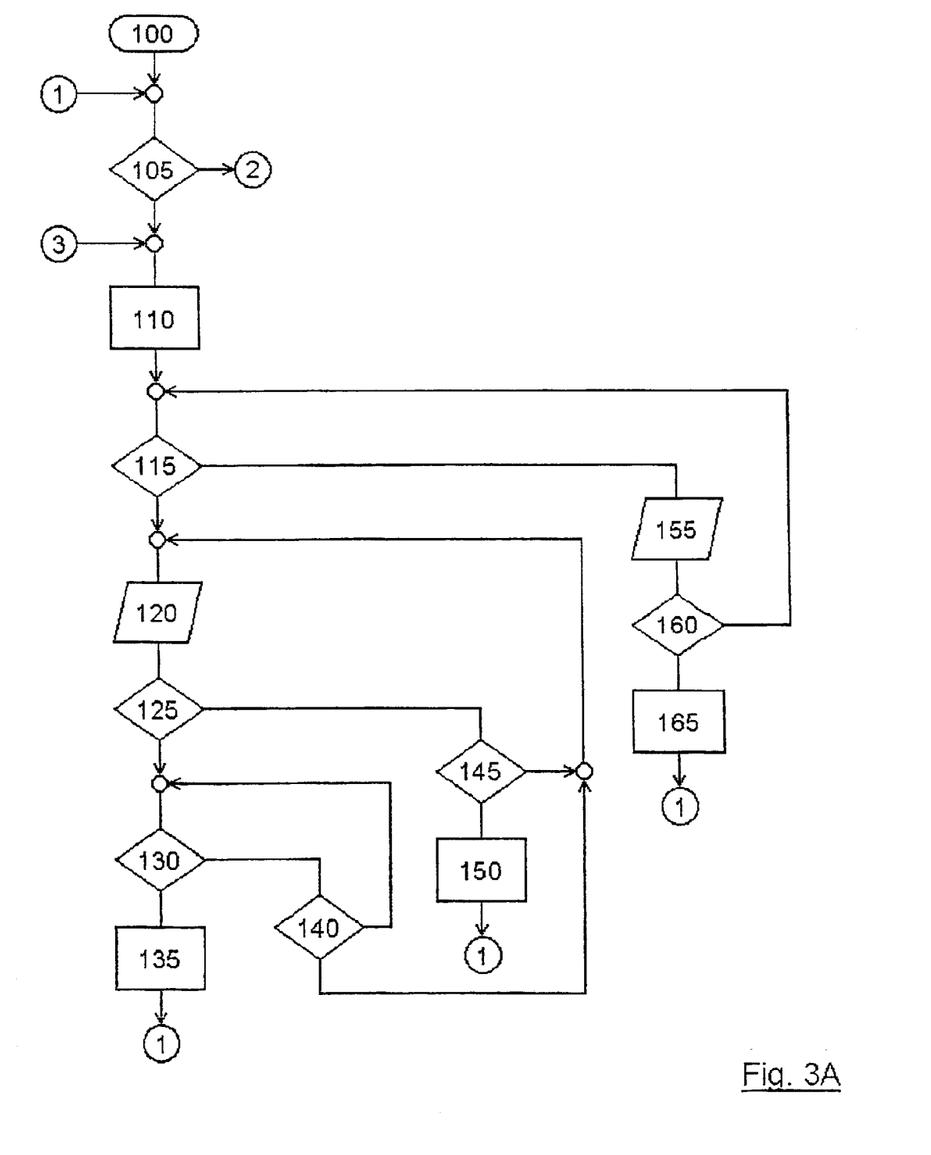
FIG. 3A shows a first flow chart of an exemplary embodiment of the method according to the present invention for the reproduction of information.
Figure 3B:
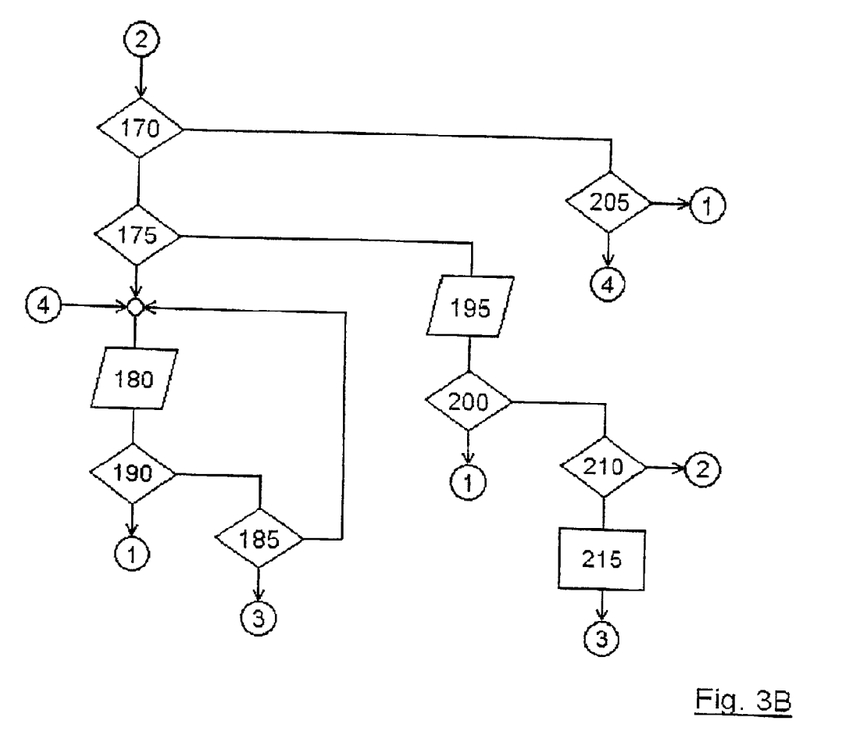
FIG. 3B shows a second flow chart of an exemplary embodiment of the method according to the present invention for the reproduction of information.

The execution sequence of the method according to the present invention is explained below with reference to the flow chart depicted in FIGS. 3A and 3B.

The sequence starts with step 100, for example when a unit according to the present invention, in which the method according to the present invention is implemented, is switched on.

In step 105, controller 30 first checks whether any current information from first information source 15, i.e. for example a current radio traffic announcement, is present, meaning that output 17 of first information source 15 indicates the presence of information. If information from first information source 15 is present, execution then goes to step 110, where the controller starts recording the information from first information source 15 by way of recording unit 25. Step 115 then checks whether current information from a further information source 20, i.e. for example a driving instruction of the navigation system requiring reproduction, is present. If so, in step 120 controller 30 connects further input 32 of forwarding circuit 35, to which the further information source is connected, to its output 34.

The connection between first input 31, i.e. first information source 15, and reproduction apparatus 40 is simultaneously interrupted. Output of the information from further information source 20 thus takes place.

As execution continues, step 125 then checks whether the information from further information source 20 has been completely reproduced. As soon as this is the case, execution moves to step 130, where a check is made as to whether the information from the first information source has already been completely recorded. If so, then in step 135 the recording of the information from first information source 15 is stopped, and execution returns to step 105, indicated in FIG. 3A by the branching instruction (1) and the corresponding entry point (1) prior to step 105.

If, however, it is found in step 125 that reproduction of the information from further information source 20 is not yet complete, then a step 145 checks whether recording of the information from the first information source is complete. If so, then in step 150 recording is stopped, and execution transitions via entry point (1) to step 105. As explained later, reproduction of the information from further information source 20 is then continued in step 180. If, on the other hand, recording is not yet complete, execution then returns to step 120, i.e. recording of the information from further information source 20 continues.

If it is found in step 130 that output 17 of the first information still indicates the presence of information, meaning that recording of the information from first information source 15 is not yet complete, execution then moves to step 140. There a check is made as to whether in the meantime, information to be reproduced from a further information source 20 is pending. If so, execution returns to step 120, in which reproduction of the information from further information source 20 takes place.

If, however, it is found in step 140 that no information from a further information source is currently present, execution then returns to step 130, i.e. to the check as to whether recording of the information from first information source 15 has in the meantime been completed.

In other words, if recording of the information from first information source 15 is not yet complete, execution repeatedly cycles through steps 120, 125, 130, 140, . . . or 120, 125, 145, 120, . . . until it is found that the information from the first information source has been completely recorded.

If it is found in step 115 that no information from a further information source 20 is present, execution then branches to step 155, where controller 30 connects first input 31 of forwarding circuit 35, to which the first information source is connected, to its output 34, and the current information from first information source 15 is thus forwarded. Once the information from first information source 15 has been completely reproduced, which is checked in step 160, execution then moves to step 165, where recording of the information from first information source 15 is terminated by controller 30. Execution then moves to the entry point (1), i.e. to step 105.

If it is found in step 160 that recording of the current information from first information source 15 is not yet complete, execution then transitions to step 115, which checks for the presence of information from a further information source.

If the check-in step 105 arrives at a negative result, i.e. that no current information from first information source 15 is awaiting reproduction, execution then branches via entry point (2) to process step 170. That step checks whether any information from first information source 15, recorded in the speech memory or in recording unit 25, is present and has not yet been completely reproduced. If so, step 175 then checks for the presence of any information from a further information source 20. If information from a further information source 20 is present, it is then outputted in step 180. Step 190 queries whether reproduction of the information of the further information source has in the meantime been completed. If this is not the case, execution then switches to step 185, which checks whether any current information from first information source 15 is awaiting reproduction. If so, execution branches via branching point (3) to step 110, in which recording of the information from the first information source is started; and then, via 115 in step 120, output of the information from the further information source is continued. Otherwise the output, already begun, of the information from the further information source is continued in step 180. If it is found in step 190 that reproduction of the information from the further information source is complete, execution switches to step 105, i.e. the check as to whether any current information from the first information source is present.

If it is found in step 175 that no information from a further information source 20 is present, the stored information from the first information source is then played back from recording unit 25 (195). Step 200 ascertains whether output of the stored information from the first information source is complete. If so, execution then branches to step 105. Otherwise—i.e. if output of the recorded information is not yet complete—execution moves to a further query step 210 which checks for the presence of any new current information from first information source 15. If such information is present, playback of the recorded information is discontinued in step 215, and execution transitions via branching point (3) to step 110, i.e. recording of the current information from the first information source is begun. If, on the other hand, it is found in step 210 that no current information from first information source 15 is pending, execution then switches via entry point (2) to step 170, i.e. if no information from further information source 20 is present, the recorded information continues to be reproduced (loop 170, 175, 195, 200, 210, 170, . . . ).

Lastly, if it is found in step 170 that no recorded information from first information source 15 that has not yet been completely played back is present in the speech memory or recording unit 25, controller 30 then checks in step 205 whether any information from a further information source is pending. If so, execution switches via entry point (4) to step 180, where that information is reproduced.

Otherwise, i.e. if no information from a further information source 20 is present, execution switches via entry point (1) to step 105, i.e. to checking for the presence of any current information from first information source 15.

In the execution sequence described, the output of current information from the first information source is therefore given priority over that of information that is stored and has not yet been completely reproduced.

The execution sequence according to the present invention will now be explained with reference to the sequence depicted in FIG. 2.

Figure 2:
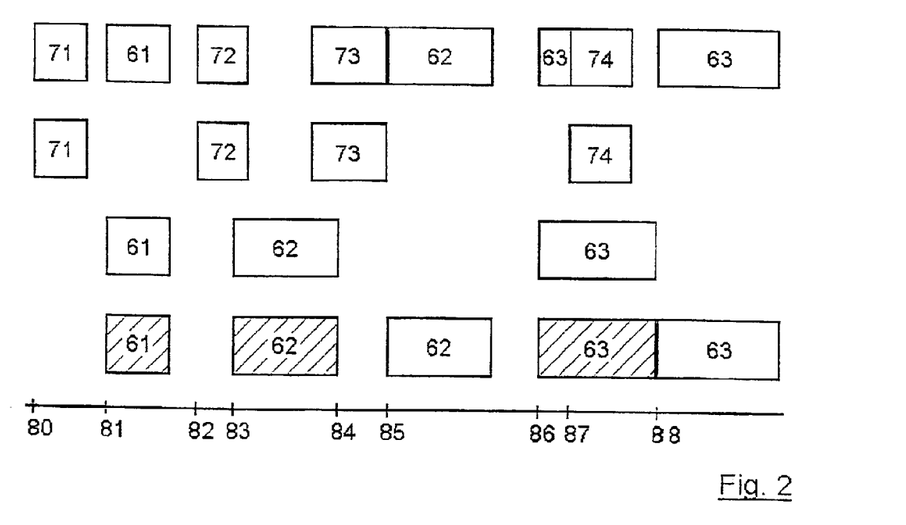
FIG. 2 shows the time sequence of the method according to the present invention with reference to a concrete stated example.

In FIG. 2, the activities of reproduction unit 40 and display unit 50 are displayed on the first line; information from a further information source 20, for example the navigation unit, on the second line; the activity of first information source 15, i.e. for example traffic radio receiver 15, on the third line; and that of recording unit 25 on the fourth line, above a time axis on which salient points in time are marked.

At a time 80, information 71 from a further information source 20, i.e. in this case from the navigation unit in the form of a driving instruction to the motor vehicle driver, is present.

Since no information from first information source 15, i.e. no current traffic information, is present, execution proceeds via steps 105, 170, and 175, or via steps 105, 170, and 205, to step 180, where starting at time 80 the reproduction of driving instruction 71 is accomplished. Once reproduction is complete (steps 180, 190, 185, 180, . . . , 190), execution returns to step 105.

If a current traffic announcement 61 is then present at time 81, recording thereof in recording unit 25 is then started in step 110. Since no driving instruction from navigation unit 20 is present at this time, reproduction of the traffic information takes place in step 155, i.e. output 16 of traffic radio receiver 15 is connected via first input 31 of forwarding circuit 35, and output 34 thereof, to reproduction apparatus 40. Then, because reproduction of the information is complete, execution switches via branching point (1) to step 105. Since no traffic announcement is present at this point in time, execution goes to step 170 and then to step 205, since the traffic announcement was completely reproduced isochronously with its recording, and no traffic radio recording that was not completely reproduced is therefore present.

If a driving instruction from navigation unit 20 is then present at time 82, navigation unit 20 is therefore connected via further input 32 of the forwarding circuit, and output 34 thereof, to reproduction apparatus 40 ((step 180), and the driving instruction is reproduced (steps 180, 190, 185, 180, . . . ).

A traffic announcement 62 now begins at time 83, during the reproduction of driving instruction 72, so that execution switches via steps 190 and 185 to step 110, where the controller begins recording traffic information 62 in recording unit 25. The recording is indicated by the cross-hatching of block 62 on the fourth line. At the same time, the ongoing driving instruction 72 from navigation unit 20 continues to be outputted in step 120. Once the driving instruction has been completely reproduced, recording continues in steps 130 and 140.

At time 84, a further driving instruction 73 arrives (still during the recording of traffic information 62), and is then reproduced in step 120.

At time 85 the reproduction of driving instruction 73 is complete, and the execution sequence, which after the end of the recording of traffic announcement 62 during the driving instruction had arrived via steps 125, 145, 150, 105, 170, and 175 at step 180, passes via steps 190, 105, 170, and 175 to step 195, where output of the stored traffic announcement takes place beginning at time 85 (195, 200, 210, 170, . . . ). Since no further driving instruction is present (step 175), the stored information 62 is completely outputted (steps 195, 200, 210, 170, 175, 195, . . . ). Output from the speech memory or recording unit 25 is indicated by an unhatched block 62 on the fourth line. Once the recorded traffic information has been completely reproduced, execution switches via step 200 into a waiting loop through steps 105, 170, 205, 105, etc.

At time 86 a new current traffic announcement 63 begins; it is recorded in known fashion (cross-hatched block 63 on the fourth line) and, since no driving instruction is present, is at first also reproduced (block 63 on first line) (steps 105, 110, 115, 155, 160, 115, 155, etc.).

At time 87 a driving instruction 74 from navigation unit 20 once again begins, so that execution shifts via step 115 to step 120, where driving instruction 74 is reproduced instead of the current traffic information 62.

After it has ended (steps 120, 125) and after the subsequent completion of the recording of traffic information 63 (steps 130, 140, 130, . . . , 130, 135), execution passes at time 88 via steps 105, 170, and 175 to step 195, where—because no information from the navigation device is present—the recorded traffic information is completely reproduced; then, as long as no further information is present, execution once again transitions via step 200 into the waiting loop of steps 105, 170, 205, 105, etc.

The execution sequence described above ends, in the present exemplary embodiment, when an arrangement according to the present invention, for example a combined audio and/or navigation and/or telecommunications apparatus or the like for a motor vehicle, in which the execution sequence is implemented, is shut off. It is advantageous in this context if, for example, a traffic radio recording that has begun is completely recorded even after the apparatus is shut off. Immediate shutoff of all components along with shutoff of the apparatus can, however, also be provided for. Lastly, provision can also be made for time-controlled or even permanent recording readiness even when the unit is switched off.

The execution sequence described above represents only one specific advantageous exemplary embodiment of the invention. The execution sequence can, however, also be realized in a different fashion. In particular, the sequences depicted and the contents of the method steps are not mandatory in that form.

For example, provision can be made for connecting more than one further source 20 to a correspondingly expanded forwarding circuit 35. The execution sequence described above would, of course, need to be correspondingly adapted for any such expansion.

Provision can moreover also be made, according to a development of the present invention, for conflicts between, for example, an optical driving instruction that is outputted via display 50, and a traffic message that is to be reproduced acoustically, to be avoided because of the possible attention conflicts resulting therefrom. For that purpose, reproduction of the traffic information would need to be deferred until after the output of the optical driving instruction, and the execution sequence just described would need to be adapted accordingly.

According to the present invention, it can also be provided that recorded information is not necessarily automatically reproduced only after it has been completely recorded. Instead, it is also possible for the user to retrieve the recording even during the recording.

Similarly, the reproduction of recorded information need not automatically begin after resolution of a conflict situation; instead, it can also be started by the user at a suitable time and not until needed.

What is claimed is:

1. A method for performing a reproduction of information, comprising the steps of:

upon an arrival of information from a first information source, reproducing the information from the first information source provided no information from a further information source is present;

upon an arrival of information from the further information source, reproducing the information from the further information source on a priority basis before any information from the first information source, wherein:

if the reproducing of the information from the first information source is being performed upon the arrival of the information from the further informa tion source, the reproducing of the information from the first information source is interrupted;

upon the arrival of the information from the first information source, recording the information from the first information source;

upon the arrival of the information from the further information source during the reproducing of recorded information from the first information source, interrupting the reproduction of the recorded information from the first information source, and reproducing the information from the further information source on the priority basis; and after completion of the priority-basis reproduction of the information from the further information source, beginning the reproducing of the recorded information from the first information source.

2. The method according to claim 1, wherein:

the information from the first information source includes radio announcements transmitted within a received radio program.

3. The method according to claim 2, wherein:

the information from the first information source includes identifiers transmitted as part of the received radio program.

4. The method according to claim 1, wherein:

the information from the further information source is information from a navigation unit.

5. The method according to claim 4, wherein:

the information from the further information source includes driving instructions.

* * * * *